Patented Mar. 29, 1938

2,112,405

UNITED STATES PATENT OFFICE 2,112,405

POLYAZO-DYESTUFFS

Bertram Mayer and Ernst Alfred Henzi, Basel, Switzerland, assignors to the firm of Society of Chemical Industry in Basle, Basel, Switzerland No Drawing. Application December 28, 1936, Serial No. 117,970. In Switzerland January 9, 1936

9 Claims. (Cl. 260—44.2)

In Patent No. 1,667,327 there is described a series of valuable polyazo-dyestuffs which are made by causing to react on 1 mol. of resorcinol in any order 1 mol. of diazotized dehydrothiotoluidine sulfonic acid and 1 mol. of a diazotized para-aminoazo-dyestuff of the general formula $R_1$—N=N—$R_2$—$NH_2$, in which $R_1$ and $R_2$ are the same or different aromatic nuclei free from hydroxyl groups.

The dyestuffs obtained in the above manner dye cotton valuable tints which are characterized by their general good properties of fastness. On the other hand their affinity for vegetable fiber is not quite satisfactory.

The present invention relates to the manufacture of other dyestuffs also containing a thiazole radical which are characterized by an equally good levelling capacity and an essentially enhanced affinity for vegetable fiber. The manufacture consists in causing to act on resorcinol in any order 1 mol. of diazotized sulfonic acid of the thiazole series, such as diazotized dehydrothiotoluidine sulfonic acid, diazotized primuline or diazotized para-aminophenylnaphthothiazole sulfonic acid and 1 mol. of a diazotized para-aminoazo-dyestuff of the general formula $$R_1\text{---}N\text{==}N\text{---}R_2\text{---}NH_2$$

in which $R_2$ is the radical of a so-called middle component, for example a middle component of the benzene series, such as para-xylidine, 1-amino-2-ethoxy-3-methylbenzene or 1-amino-2:5-diethoxybenzene, or a middle component of the naphthalene series, such as 1-aminonaphthalene, 1-aminonaphthalene-6- or 7-sulfonic acid, 1-amino-2-methoxynaphthalene and the 6-sulfonic acid thereof, and $R_1$ is the radical of a so-called intermediate product from 1 mol. of a 4:4'-tetrazo-compound of the diphenyl series and 1 mol. of a yellow component, for instance phenol, salicyclic acid, 1-phenyl-3-methyl-5-pyrazolone or acetoacetic acid anilide or a sulfonic acid thereof.

The new dyestuffs correspond therefore to the general formula

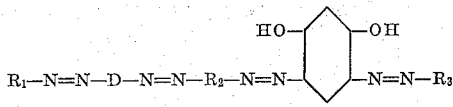

in which $R_1$ stands for a radical of a yellow component selected from the group consisting of monohydroxy derivatives of the benzene series, 1-phenyl-5-pyrazolones, and arylides of the acetoacetic acid, D stands for a radical of the diphenyl series the two azo-groups being linked at the 4- and 4'-position, $R_2$ stands for an aromatic nucleus selected from the group consisting of aromatic nuclei of the benzene and naphthalene series, the two azo-groups being linked at the 1- and 4-position, and $R_3$ stands for a radical selected from the group of radicals consisting of sulfonic acids of the $\mu$-phenyl benzthiazol and $\mu$-phenyl-naphthothiazol series, the azo-groups being linked at the $\mu$-phenyl radical, but not in orthoposition to the $\mu$-carbon atom, in which further at least one of the two radicals $R_1$ and $R_2$ contains at least one sulfonic acid group, which products are dark powders dissolving in water to brown solutions and in sulfuric acid to red-violet and green solutions, and dye cotton, viscose rayon and leather brown tints, and which dyestuffs, when being dyed on union fabrics consisting of cotton and acetate artificial silk, leave the latter fiber undyed.

The following examples illustrate the invention, the parts being by weight:—

Example 1

18.4 parts of 4:4'-diaminodiphenyl are tetrazotized in the usual manner and coupled with 15 parts of salicylic acid in a solution alkaline with sodium carbonate. When coupling is complete a solution of 24.5 parts of sodium-1-aminonaphthalene-6- or 7-sulfonate are added. When coupling is complete the dyestuff which has been formed is filtered, stirred with water, further diazotized with nitrite and hydrochloric acid and coupled in a solution alkaline with sodium carbonate with the monoazo-dyestuff from diazotized primuline and 1:3-dihydroxybenzene. This monoazo-dyestuff is produced by diazotizing 58.6 parts of primuline (sulfonated primuline base), adding the diazo-compound to an aqueous solution of 11 parts of 1:3-dihydroxybenzene, and after prolonged stirring neutralizing the mineral acid with dilute sodium carbonate solution. When coupling is complete the dyestuff of the formula

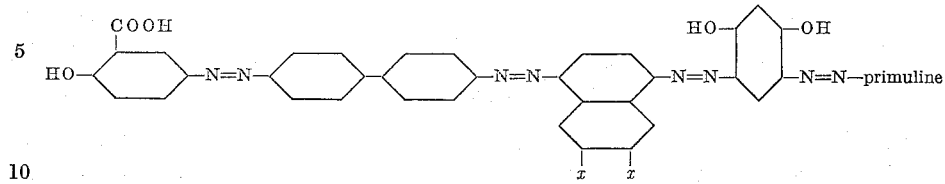

(in which one $x$ stands for H and the other $x$ for SO$_3$H) is salted out at 60–70° C., filtered and dried. It is a dark powder soluble in water to a brown solution and in concentrated sulfuric acid to a violet solution. It dyes cotton or leather brown.

Similar dyestuffs are obtained when the salicylic acid is exchanged for another yellow component, for instance one of the 3-cresotinic acids, para-cresol or xylenol and the primuline is exchanged for another thiazole derivative, for instance dehydrothiotoluidine sulfonic acid. The 4:4'-diaminodiphenyl may be exchanged for another diphenyl derivative, for instance 4:4'- diamino-3:3'-dimethyldiphenyl.

*Example 2*

18.4 parts of 4:4'-diaminodiphenyl are tetrazotized in the usual manner and coupled in solution alkaline with sodium carbonate with 15 parts of salicylic acid. When coupling is complete the compound is further coupled with 13.7 parts of 1-amino-2-methoxy-5-methylbenzene in neutral solution. When coupling is complete the dyestuff formed is filtered, stirred with water and further diazotized with nitrite and hydrochloric acid and then coupled in solution alkaline with sodium carbonate with the intermediate dyestuff described in Example 1 from 58.6 parts of primuline and 11 parts of resorcinol. When coupling is complete the dyestuff of the formula

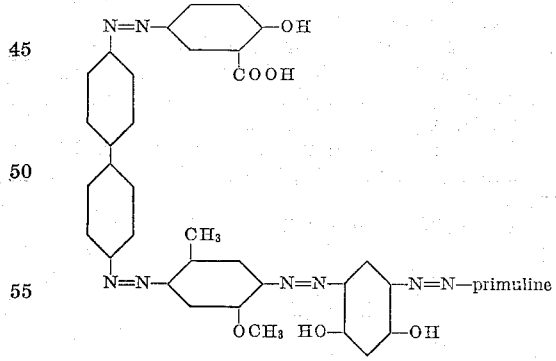

is salted out at 60–70° C., filtered and dried. It is a dark powder which dissolves in water to a yellowish brown solution and in concentrated sulfuric acid to a red-violet solution. It dyes cotton yellowish brown.

Similar dyestuffs are produced when the salicylic acid is exchanged for 1-phenyl-3-methyl-5-pyrazolone-4'-sulfonic acid, and the 1-amino-2-methoxy-5-methylbenzene is exchanged for other middle components of the benzene series, such as for example para-xylidine or 1-amino-2:5-dimethoxybenzene.

*Example 3*

18.4 parts of 4:4'-diaminodiphenyl are tetrazotized in the usual manner and coupled in solution alkaline with sodium carbonate with 24.5 parts of sodium-1-aminonaphthalene-6- or 7-sulfonate. When coupling is complete there is added a solution of 27.6 parts of the sodium salt of 1 - (4'-sulfophenyl)-3-methyl - 5 - pyrazolone. When coupling is complete the dyestuff thus formed is salted out in alkaline solution, filtered, stirred with water, further diazotized with nitrite and hydrochloric acid and coupled in solution alkaline with sodium carbonate with the intermediate dyestuff described in Example 1 from 58.6 parts of primuline and 11 parts of resorcinol. When coupling is complete the dyestuff of the formula

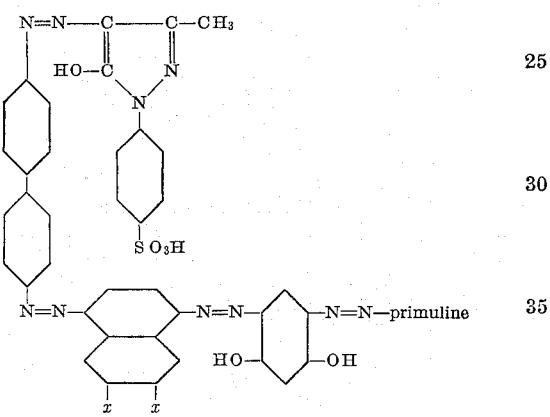

(in which one $x$ stands for H and the other $x$ stands for SO$_3$H) is salted out at 60–70° C., filtered and dried. It is a dark powder which dissolves in water to a yellowish brown solution and in concentrated sulfuric acid to a red-violet solution. It dyes cotton yellowish brown.

A similar dyestuff is obtained by substituting dehydrothiotoluidine sulfonic acid for the primuline. Similar products are produced when the 4:4'-diaminodiphenyl is exchanged for 4:4'-diamino-3:3'-dimethyldiphenyl or 4:4'-diamino-3:3'-dichlorodiphenyl. The yellow component may be exchanged for another yellow component, for instance sulfonic acid of acetoacetic acid anilide. Finally, also the 1-aminonaphthalene-6- or 7-sulfonic acid may be exchanged for 1-aminonaphthalene.

*Example 4*

18.4 parts of 4:4'-diaminodiphenyl are tetrazotized in the usual manner and coupled in solution alkaline with sodium carbonate with 15 parts of salicylic acid. When coupling is complete there is added a solution of 24.5 parts of sodium-1-aminonaphthalene-6- or 7-sulfonate. When coupling is complete the dyestuff thus formed is filtered, stirred with water and further diazotized with nitrite and hydrochloric acid and coupled in presence of sodium carbonate with the monoazo-dyestuff from 1:3-dihydroxybenzene and the thiazole derivative obtainable by condensing sodium-2-amino-5-hydroxy-7-naphthalene sulfonate with 1-nitro-3-benzaldehyde and sodium polysulfide.

This monoazo-dyestuff is produced by diazotizing 37.2 parts of the above named thiazole derivative of the formula

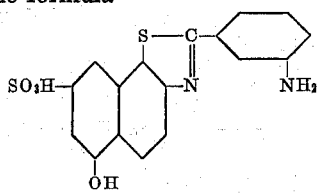

with nitrite and hydrochloric acid, adding the diazo-compound to an aqueous solution of 11 parts of 1:3-dihydroxybenzene and gradually neutralizing the mineral acid by means of a dilute solution of sodium carbonate. When coupling is complete the dyestuff is salted out, filtered and stirred with water. When the coupling of the final dyestuff of the formula

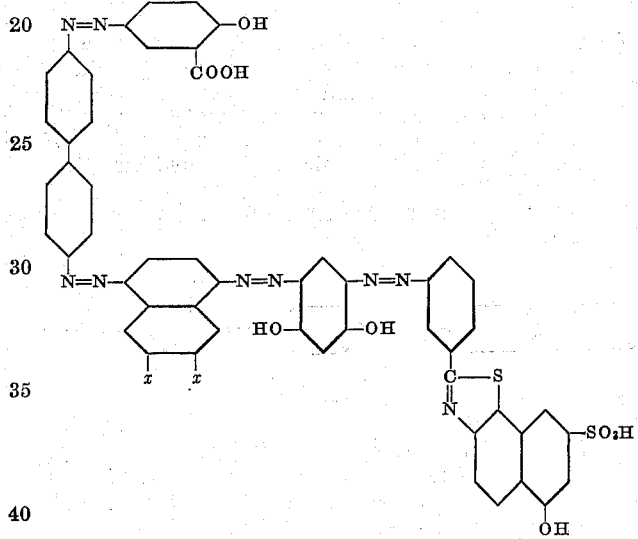

(in which one $x$ stands for H and the other $x$ stands for $SO_3H$) is complete the latter is salted out, filtered and dried. It is a dark powder soluble in concentrated sulfuric acid to a blue-green solution and in water to a reddish brown solution. It dyes cotton brown.

Similar products are obtained when the 1-aminonaphthalene-6- or 7-sulfonic acid is exchanged for another middle component of the naphthalene series, for example the 1-amino-2-methoxynaphthalene-6-sulfonic acid, or when the benzidine is exchanged for 4:4'-diamino-3:3'-dimethyldiphenyl or 4:4'-diamino-3:3'-dimethoxydiphenyl or 4:4'-diamino-3:3'-dichlorodiphenyl.

What we claim is:
1. The polyazo-dyestuffs of the general formula

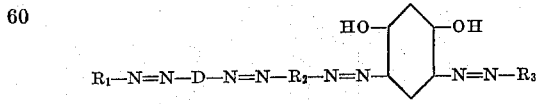

in which $R_1$ stands for a radical of a yellow component selected from the group consisting of monohydroxy derivatives of the benzene series, 1-phenyl-5-pyrazolones, and arylides of the aceto-acetic acid, D stands for a radical of the diphenyl series, the two azo-groups being linked at the 4- and 4'-position, $R_2$ stands for an aromatic nucleus selected from the group consisting of aromatic nuclei of the benzene and naphthalene series, the two azo-groups being linked at the 1- and 4-position, and $R_3$ stands for a radical selected from the group consisting of the radicals of sulfonic acids of the $\mu$-phenyl-benzthiazole and $\mu$-phenyl-naphthothiazole series, the azo-groups being linked at the $\mu$-phenyl radical, but not in ortho-position to the $\mu$-carbon atom in which further at least one of the two radicals $R_1$ and $R_2$ contains at least one sulfonic acid group, which products are dark powders dissolving in water to brown solutions and in sulfuric acid to red-violet and green solutions, and dye cotton, viscose rayon and leather brown tints, and which dyestuffs, when being dyed on union fabrics consisting of cotton and acetate artificial silk, leave the latter fiber undyed.

2. The polyazo-dyestuffs of the general formula

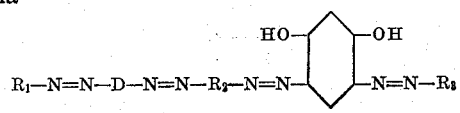

in which $R_1$ stands for a radical of a yellow component selected from the group consisting of monohydroxy derivatives of the benzene series, 1-phenyl-5-pyrazolones, and arylides of the acetoacetic acid, D stands for a radical of the diphenyl series, the two azo-groups being linked at the 4- and 4'-position, $R_2$ stands for an aromatic nucleus of the naphthalene series, the two azo-groups being linked at the 1- and 4-position, and $R_3$ stands for a radical selected from the group consisting of the sulfonated radicals of the formulas

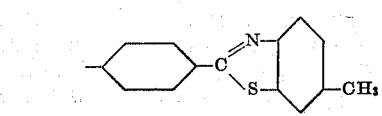

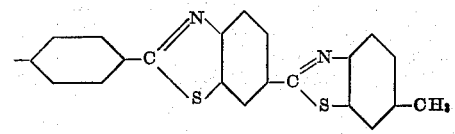

and

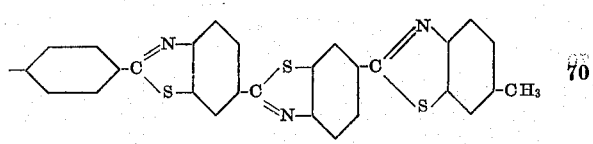

in which further at least one of the two radicals $R_1$ and $R_2$ contains at least one sulfonic acid group, which products are dark powders dissolving in water to brown solutions and in sulfuric acid to red-violet solutions, and dye cotton, viscose rayon and leather brown tints, and which dyestuffs, when being dyed on union fabrics consisting of cotton and acetate artificial silk, leave the latter fiber undyed.

3. The polyazo-dyestuffs of the general formula

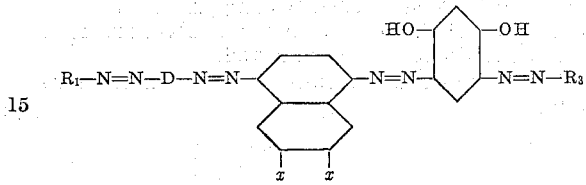

in which $R_1$ stands for a radical of a yellow component selected from the group consisting of monohydroxy derivatives of the benzene series, 1-phenyl-5-pyrazolones, and arylides of the aceto-acetic acid, D stands for a radical of the diphenyl series, the two azo-groups being linked at the 4- and 4'-position, one $x$ stands for a hydrogen atom and the other $x$ for a $SO_3H$-group, and $R_3$ stands for a radical selected from the group consisting of sulfonated radicals of the formulas

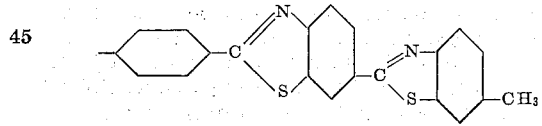

and

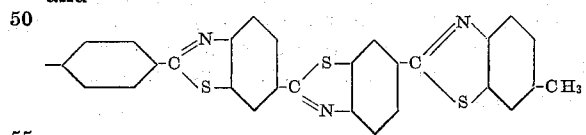

which products are dark powders dissolving in water to brown solutions and in sulfuric acid to red-violet solutions, and dye cotton, viscose rayon and leather brown tints, and which dyestuffs, when being dyed on union fabrics consisting of cotton and acetate artificial silk, leave the latter fiber undyed.

4. The polyazo-dyestuffs of the general formula

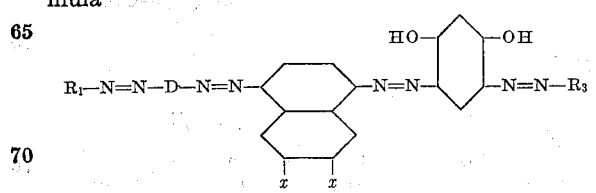

in which $R_1$ stands for a hydroxycarboxylic acid of the benzene series, D stands for a radical of the diphenyl series, the two azo-groups being linked at the 4- and 4'-position, one $x$ stands for a hydrogen atom and the other $x$ for a $SO_3H$-group, and $R_3$ stands for a radical selected from the group consisting of the sulfonated radicals of the formulas

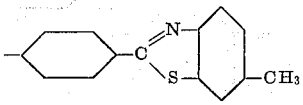

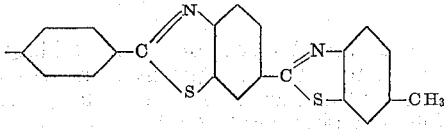

and

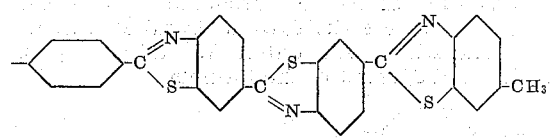

which products are dark powders dissolving in water to brown solutions and in sulfuric acid to red-violet solutions, and dye cotton, viscose rayon and leather brown tints, and which dyestuffs, when being dyed on union fabrics consisting of cotton and acetate artificial silk, leave the latter fiber undyed.

5. The polyazo-dyestuffs of the general formula

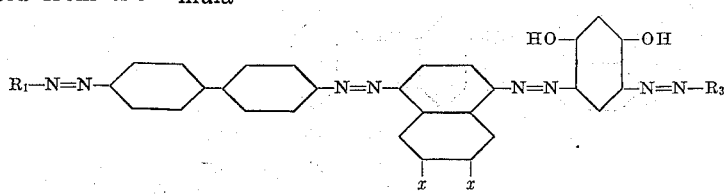

in which $R_1$ stands for a hydroxycarboxylic acid of the benzene series, one $x$ stands for a hydrogen atom and the other $x$ for a $SO_3H$-group, and $R_3$ stands for a radical selected from the group consisting of sulfonated radicals of the formulas

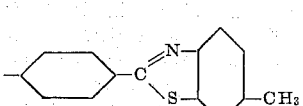

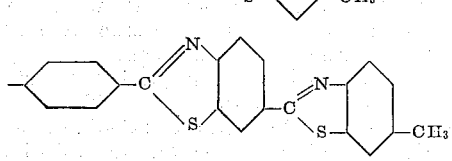

and

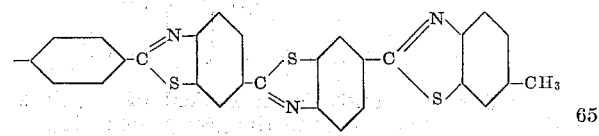

which products are dark powders dissolving in water to brown solutions and in sulfuric acid to red-violet solutions, and dye cotton, viscose rayon and leather brown tints, and which dyestuffs, when being dyed on union fabrics consisting of cotton and acetate artificial silk, leave the latter fiber undyed.

6. The polyazo-dyestuffs of the general formula

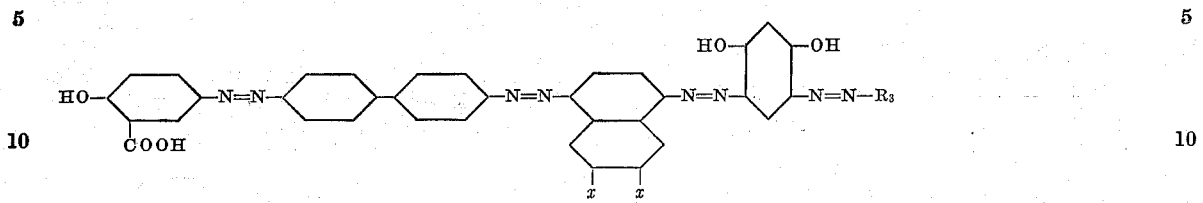

in which one $x$ stands for a hydrogen atom and the other $x$ for a $SO_3H$-group, and $R_3$ stands for a radical selected from the group consisting of the sulfonated radicals of the formulas

[structure: phenyl-C(=N)(S)-benzothiazole-CH₃]

[structure: phenyl-C(=N)(S)-benzothiazole-C(=N)(S)-CH₃]

and

[structure: phenyl-C(=N)(S)-benzothiazole-S-benzothiazole-C-CH₃]

which products are dark powders dissolving in water to brown solutions and in sulfuric acid to red-violet solutions, and dye cotton, viscose rayon and leather brown tints, and which dyestuffs, when being dyed on union fabrics consisting of cotton and acetate artificial silk, leave the latter fiber undyed.

7. The polyazo-dyestuffs of the general formula

[structure similar to formula shown above]

in which one $x$ stands for a hydrogen atom and the other x for a $SO_3H$-group, and $R_3$ stands for the sulfonated radicals of the formulas

[structure: phenyl-C(=N)(S)-benzothiazole-C(=N)(S)-CH₃]

and

[structure: phenyl-C(=N)(S)-benzothiazole-S-benzothiazole-C-CH₃]

which products are dark powders dissolving in water to brown solutions and in sulfuric acid to red-violet solutions, and dye cotton, viscose rayon and leather brown tints, and which dyestuffs, when being dyed on union fabrics consisting of cotton and acetate artificial silk, leave the latter fiber undyed.

8. The polyazo-dyestuffs of the general formula

[structure similar to formula shown above]

in which one $x$ stands for a hydrogen atom and the other $x$ for a $SO_3H$-group, and $R_3$ stands for the sulfonated radical of the formula

[structure: phenyl-C(=N)(S)-benzothiazole-CH₃]

which products are dark powders dissolving in water to brown solutions and in sulfuric acid to red-violet solutions, and dye cotton, viscose rayon and leather brown tints, and which dyestuffs, when being dyed on union fabrics consisting of cotton and acetate artificial silk, leave the latter fiber undyed.

9. The polyazo-dyestuffs of the general formula 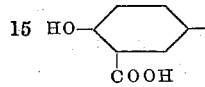

in which one $x$ stands for a hydrogen atom and the other $x$ for a $SO_3H$-group, which products are dark powders dissolving in water to brown solutions and in sulfuric acid to green solutions, and dye cotton, viscose rayon and leather brown tints, and which dyestuffs, when being dyed on union fabrics consisting of cotton and acetate artificial silk, leave the latter fiber undyed.

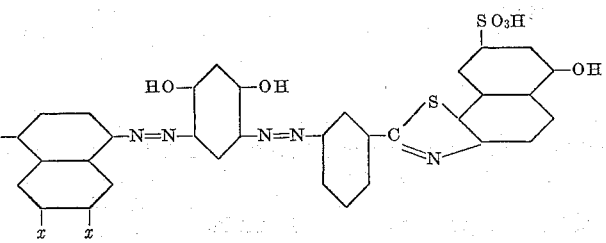

BERTRAM MAYER.
ERNST ALFRED HENZI.